United States Patent
Muehlenhoff et al.

(10) Patent No.: US 11,558,493 B2
(45) Date of Patent: Jan. 17, 2023

(54) METHOD AND COMPUTER SYSTEM FOR MONITORING MESSAGE PACKETS

(71) Applicant: dSPACE digital signal processing and control engineering GmbH, Paderborn (DE)

(72) Inventors: Christoph Muehlenhoff, Bad Driburg (DE); Remigiusz Seiler, Paderborn (DE)

(73) Assignee: dSPACE GmbH, Paderborn (DE)

( * ) Notice: Subject to any disclaimer, the term of this patent is extended or adjusted under 35 U.S.C. 154(b) by 0 days.

(21) Appl. No.: 17/338,003

(22) Filed: Jun. 3, 2021

(65) Prior Publication Data

US 2021/0385307 A1   Dec. 9, 2021

(30) Foreign Application Priority Data

Jun. 3, 2020 (DE) .................... 10 2020 114 742.2

(51) Int. Cl.
*G06F 15/16* (2006.01)
*H04L 69/22* (2022.01)
(Continued)

(52) U.S. Cl.
CPC .............. *H04L 69/22* (2013.01); *H04L 43/02* (2013.01); *H04L 63/0428* (2013.01); *H04L 69/16* (2013.01)

(58) Field of Classification Search
CPC ......... H04L 43/02; H04L 69/22; H04L 69/16; H04L 63/0428
(Continued)

(56) References Cited

U.S. PATENT DOCUMENTS 3,766,322 A * 10/1973 Moffett .................. H04L 12/64
370/422
5,751,723 A * 5/1998 Vanden Heuvel ...... H04L 12/56
370/523
(Continued)

FOREIGN PATENT DOCUMENTS

DE   102012104842 A1   12/2013
DE   102018111851 A1   11/2019
WO   WO0014966 A1    3/2000

OTHER PUBLICATIONS

Proseminar "Selected Topics in Media Technology" MPEG-2 coding and MPEG-2 data streams, Steffen Buchner et al—Jul. 5, 2007.
(Continued)

*Primary Examiner* — Bharat Barot
(74) *Attorney, Agent, or Firm* — Muncy, Geissler, Olds & Lowe, P.C.

(57) ABSTRACT

A method for monitoring message packets that are exchanged between at least two control units. The message packets are concatenated in a data stream and each have an identifier, a payload, and a length specification of the payload described by a data item of predefined word size. The at least two control units are connected by a distributor. The distributor is connected by a first distributor port to a first of the at least two control units, is connected by a second distributor port to a second of the at least two control units, and is connected by a third distributor port to a computer system. The data stream flows through the first and distributor port for communication between the first node and the second node. The computer system has a memory, and information on the respective identifiers of the message packets is stored in the memory.

9 Claims, 3 Drawing Sheets

(51) Int. Cl.
  *H04L 69/16*  (2022.01)
  *H04L 43/02*  (2022.01)
  *H04L 9/40*  (2022.01)

(58) Field of Classification Search
  USPC .................................. 709/223–224, 231–232
  See application file for complete search history.

(56) References Cited

U.S. PATENT DOCUMENTS

| | | |
|---|---|---|
| 6,907,067 B1 | 6/2005 | Moeller et al. |
| 7,734,808 B1 * | 6/2010 | Bergamasco ........... H04L 47/10 |
| | | 709/230 |
| 7,792,046 B2 * | 9/2010 | Kucharczyk ........ H04L 63/0272 |
| | | 370/413 |
| 11,425,232 B2 * | 8/2022 | Huddleston ............. H04L 69/40 |
| 2014/0075041 A1 * | 3/2014 | Keesara .................. H04L 49/20 |
| | | 709/231 |
| 2014/0122735 A1 * | 5/2014 | Jokinen ............... H04L 47/2441 |
| | | 709/231 |
| 2017/0220712 A1 | 8/2017 | Blesken et al. |
| 2021/0081585 A1 | 3/2021 | Schedler |

OTHER PUBLICATIONS

German Office Action dated May 12, 2021 in corresponding application 102020114742.2.

* cited by examiner

METHOD AND COMPUTER SYSTEM FOR MONITORING MESSAGE PACKETS

This nonprovisional application claims priority under 35 U.S.C. § 119(a) to German Patent Application No. 10 2020 114 742.2, which was filed in Germany on Jun. 3, 2020 and which is herein incorporated by reference.

BACKGROUND OF THE INVENTION

Field of the Invention

The present invention relates to a method and computer system for monitoring message packets that are exchanged between at least two control units, wherein the message packets are concatenated in a data stream and wherein the message packets each have an identifier, a payload, and a length specification of the payload described by a data item of predefined word size, wherein the at least two control units are connected by a distributor, for example a so-called switch, wherein the distributor is connected by a first distributor port to a first of the at least two control units, is connected by a second distributor port to a second of the at least two control units, and is connected by a third distributor port to a computer system, wherein the data stream flows through the first distributor port and the second distributor port for the purpose of communication between the first control unit and the second control unit, wherein the computer system has a memory, and wherein information on the respective identifiers of the message packets is stored in the memory.

Description of the Background Art

Such a computer system for testing the communication between control units is provided by a hardware-in-the-loop (HIL) system, for example.

When signals are exchanged between two control units, the concrete signals (such as temperature or speed information) are first packed into first message packets in compliance with a predetermined communication structure, for example in compliance with the SOME/IP protocol of the AUTOSAR Standard, with a defined header, which contains the identifier or ID of the message packet as well as information on the length of the so-called payload. These first message packets are then in turn packed into larger message packets in lower communication layers (with respect to the OSI model), which larger packets may contain several of the first message packets and are specified by the transport protocol used, are sent, and are unpacked accordingly at the receiver. Here, the term "message packets" without further specification means only the "first message packets."

In the prior art, HIL systems of the company dSPACE GmbH equipped with the "Bus Manager" configuration program, for example, have the functionality of monitoring the direct communication between two control units during an HIL simulation "on the wire," as it were, through a port of a distributor (switch) provided for this purpose, while the HIL system simulates the "environment," which is to say at least the input data expected by the control units, in real time. Monitoring communication between the control units is easily possible when the start and end of the larger packets of the transport protocol are marked, as is the case with communication by means of the UDP transport protocol, for example. When the TCP transport protocol is used, the start and end of the TCP messages generally are not marked, or the headers are removed and the receiver receives a concatenation of (very large) payload data items in a continuous data stream.

This results in the problem that useful monitoring of the communication between two control units is only possible once a "synchronization" has taken place, which is to say when the beginning and end are reliably recognized for every message packet in the continuous data stream.

But it is specifically desirable, however, to sporadically monitor the communication between two control units. For this purpose, the "SOME/IP Protocol Specification" of AUTOSAR Release 1.1.0 proposes, for example, the sending of so-called "Magic Cookies," which are easy to recognize on account of their special structure and whose end marks the beginning of a new message packet in the data stream. It is disadvantageous in practice, however, that such Magic Cookies are sent fairly rarely as a general rule so as not to load the connection, with the result that a user who would like to monitor message packets in the data stream may have to wait a relatively long time (in this context, even five seconds can be considered a relatively long time) before "synchronization" with the data stream has taken place.

SUMMARY OF THE INVENTION

It is therefore an object of the present invention to improve the state of the art and to provide a better method and system for monitoring message packets in a data stream.

The object is attained according to an exemplary embodiment of the invention in that a program for carrying out the following method steps is stored in the memory of the computer system: (a) mirroring the data stream between the first distributor port and the second distributor port at the third distributor port, and transmitting the data stream to the computer system; (b) searching in the (mirrored) data stream until a first known identifier is identified; (c) reading the data item of predefined size following the identified identifier, and interpreting the data item as a length specification for the payload of the corresponding message packet for the identified identifier; (d) checking whether the data stream has an additional known identifier after the interval determined by the length specification from step c; (e) repeating at least once the steps c and d for the corresponding additional known identifiers; and (f) If the check in step d also has a positive result after the at least one repetition: Displaying or recording on the computer system of the message packets identified in the data stream.

"Mirroring the data stream" in step a can mean here that all data of the data stream between the first distributor port and the second distributor port are also transmitted to the computer system through the third distributor port.

Searching in the data stream (step b) is accomplished in that all received data are compared with the message packet identifiers stored in the memory of the computer system. If a match results, then the following data item is interpreted as a length specification (step c) and a check is made as to whether a known ID occurs again in the data stream after exactly this length (step d).

Step e represents a safeguard for the case in which the data that are identified as the identifier of a message packet in the data stream are purely accidental matches with values from the payloads of the transmitted message packets.

This method according to the invention makes possible a "synchronizing" at any time with the message packets transmitted in the continuous data stream that is increasingly reliable with an increasing number of repetitions from step e, without it being necessary to wait for "Magic Cookies" or similar markers in the data stream.

It is advantageous, moreover, that the synchronization does not require a fixed payload length or additional information on the payload length of the message packets transmitted in the data stream. The invention permits synchronizing with an arbitrarily varying length of the (payload of the) message packets.

A required number of successive repetitions of a positive identification of an identifier from step d can be specified. As a result, the user can control the degree to which he wishes to ensure that a synchronization has actually taken place and that the value identified as corresponding to an identifier is not an accidental match.

A return in the data stream to the identifier identified in method step b and a repetition of the method starting from step b take place in the event of a negative result of the check from step d, wherein the inspection of the data stream is continued starting from the next byte.

This also means that the data of the data stream starting from the first identification of a known identifier are not discarded. For the case in which the identification of an identifier is found to be incorrect in step d, the place in the data stream identified in step b is returned to, and the search for an "actual" known identifier resumes continuously.

It is advantageous here that the data starting from the first recognized identifier can always be displayed to the user in step f, and thus as few message packets as possible (starting from the point in time when the user initiates the method according to the invention) are lost.

According to another implementation of the invention, the at least two control units can be control units under test and the computer system is provided by an HIL system for simulating the environment for the control units under test.

The method according to the invention is especially advantageous for this use case, since an HIL system often has multiple control units connected to it, not all of which must communicate directly with the HIL system. The invention now allows an especially fast "synchronization" with the data stream for monitoring the communication between two control units that are not connected directly to one another through the HIL system. The monitoring can thus take place at any arbitrary point in time during the real time-simulation of the environment for the at least two control units.

The information on the respective identifiers (ID1, ID2, ID3) of the message packets can be specified by a so-called communications matrix. The HIL system can extract the identifiers, for example, but can also extract information on signals and other quantities with a suitable program, or all relevant information from the communications matrix is made available to the HIL system in advance, for instance in a compiled program.

For example, the monitoring of the messages takes place during the environment simulation, in particular in real time, wherein the payloads of the message packets exchanged between the first control unit and the second control unit can have signals that are known to the HIL system from the communications matrix and wherein the message packets with identified identifiers are processed for display in that the corresponding payloads of the identified message packets are searched for signals known to the HIL system, and the recognized signals are caused to be displayed with corresponding marking.

According to another embodiment, the transmission of the message packets takes place via TCP. This transport protocol is an example of a transport protocol in which the transmitted data are received at the receiver in the form of a data stream.

Preferably, the message packets can conform to the SOME/IP protocol of AUTOSAR. For example, the structure of the header of the message packets with identifier and length specification can be prescribed by this protocol.

The above-mentioned object is also attained by a computer system for carrying out the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
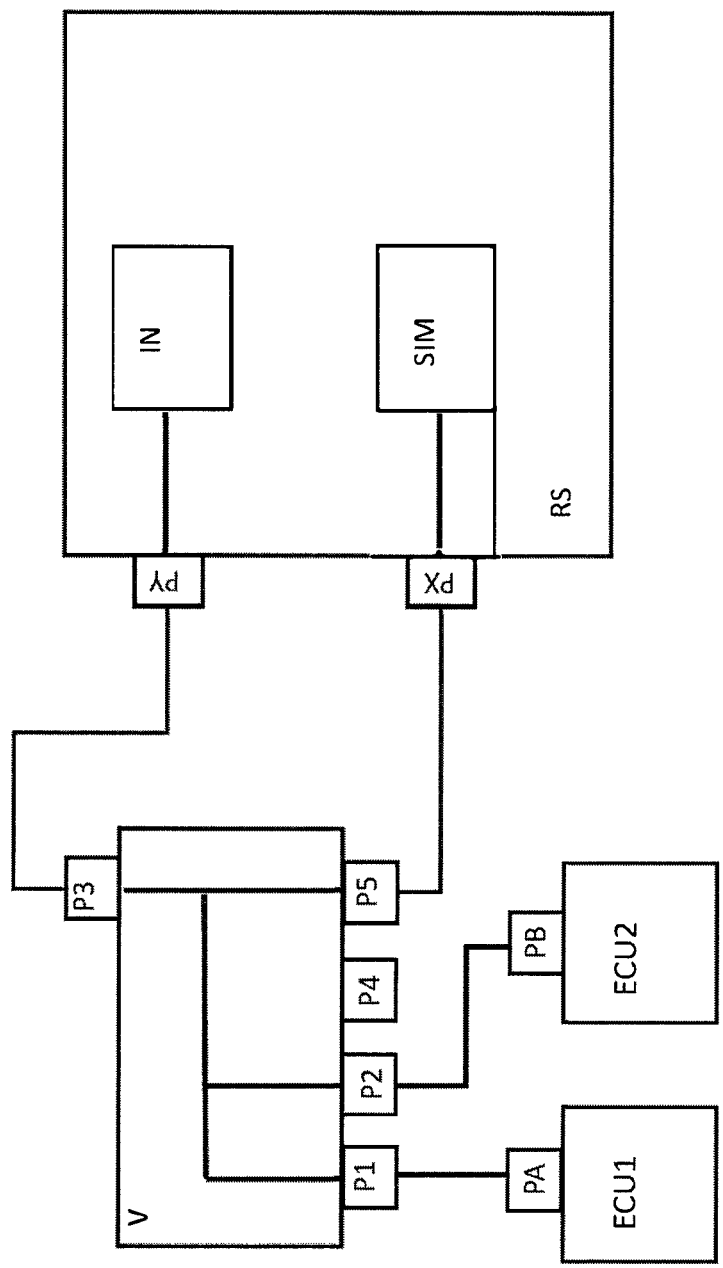
FIG. 1 shows a system for carrying out the method according to the invention.

FIG. 1 shows a computer system RS for testing control units, wherein a first control unit ECU1 communicates here with a second control unit ECU2 through a distributor (switch) V in that message packets are sent from a port PA of the first control unit ECU1 to a port P1 of the distributor V and from another port P2 of the distributor V to a port PB of the second control unit. The communication can also take place in the opposite direction here.

In this exemplary embodiment, the distributor has further additional ports P3, P4, P5, wherein data are transmitted through port P5, for example, to a port PX of the computer system RS and delivered to a simulation program SIM that is located on the computer system RS and is equipped to simulate data required by the control units ECU1 and ECU2 so that a realistic environment is imitated for the control units ECU1 and ECU2 for test purposes. For example, the simulation program SIM can simulate engine signals for an engine control unit. Preferably the signals are sent to the control units ECU1 and ECU2 in real time, which means that certain signals must arrive within a predetermined time window.

Drawn on the computer system RS in FIG. 1 is one more additional port PY, which is connected to the port P3 of the distributor V. Through the port PY, the (inspection) program IN likewise located on the computer system RS receives the message traffic between the ports P1 and P2 mirrored in the distributor V, which reproduces the communication between the control units ECU1 and ECU2 in the form of a data stream.

The program IN has instructions for requesting, analyzing, and processing the data in accordance with the steps according to the invention.

Figure 2:
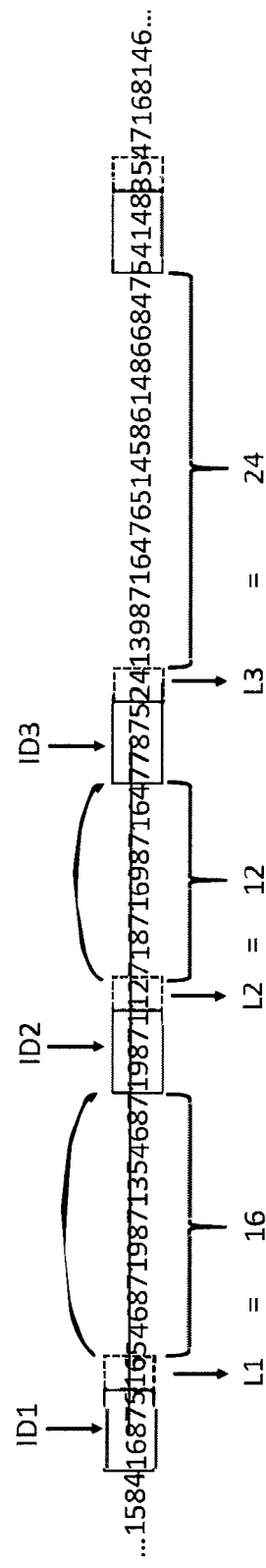
FIG. 2 shows an illustration of the method steps.

FIG. 2 illustrates the steps b to e according to the invention by way of example. The data stream, which starting from the point in time when the user gives the command to monitor the communication between the control units ECU1 and ECU2, is represented symbolically by a series of numbers. Since the command is not synchronous with the communication of the control units, the first transmitted data generally will not specify the identifier of a first message packet, but instead may possibly be an arbitrary data item from a payload. By means of the program IN located on the computer system RS, the incoming data are now analyzed and searched for the occurrence of a first number sequence (actually a byte sequence consisting of two bytes) that corresponds to a known identifier. In FIG. 2, such a number sequence (the digits 16875) is identified as the identifier ID1. Now the immediately following data item of predefined size (for example, the next byte; in the exemplary embodiment in FIG. 2, it is the next two digits) is interpreted as a length specification L1=16 for the payload of the message packet with the identifier ID1=16875, and a check is performed as to whether a known ID follows again after 16 places (or the specified number of bytes). In FIG. 2, 19871 is recognized as ID2, and the next two places are interpreted as payload length L2=12. After 12 places, the data stream has an additional known identifier ID3=77875, and a payload length L3=24 is assumed for the message packet with this identifier on the basis of the following two places. In this example, it is now taken as a given that a synchronization with the data stream has taken place and the program IN can cause the recognized message packets to be displayed. Not shown here is that the program IN also analyzes the data of the payload on the basis of information from the communications matrix and displays to the user not only the raw data from the payload, but also the signals identified therein, such as signals for speed, engine speed, or the like.

Figure 3:
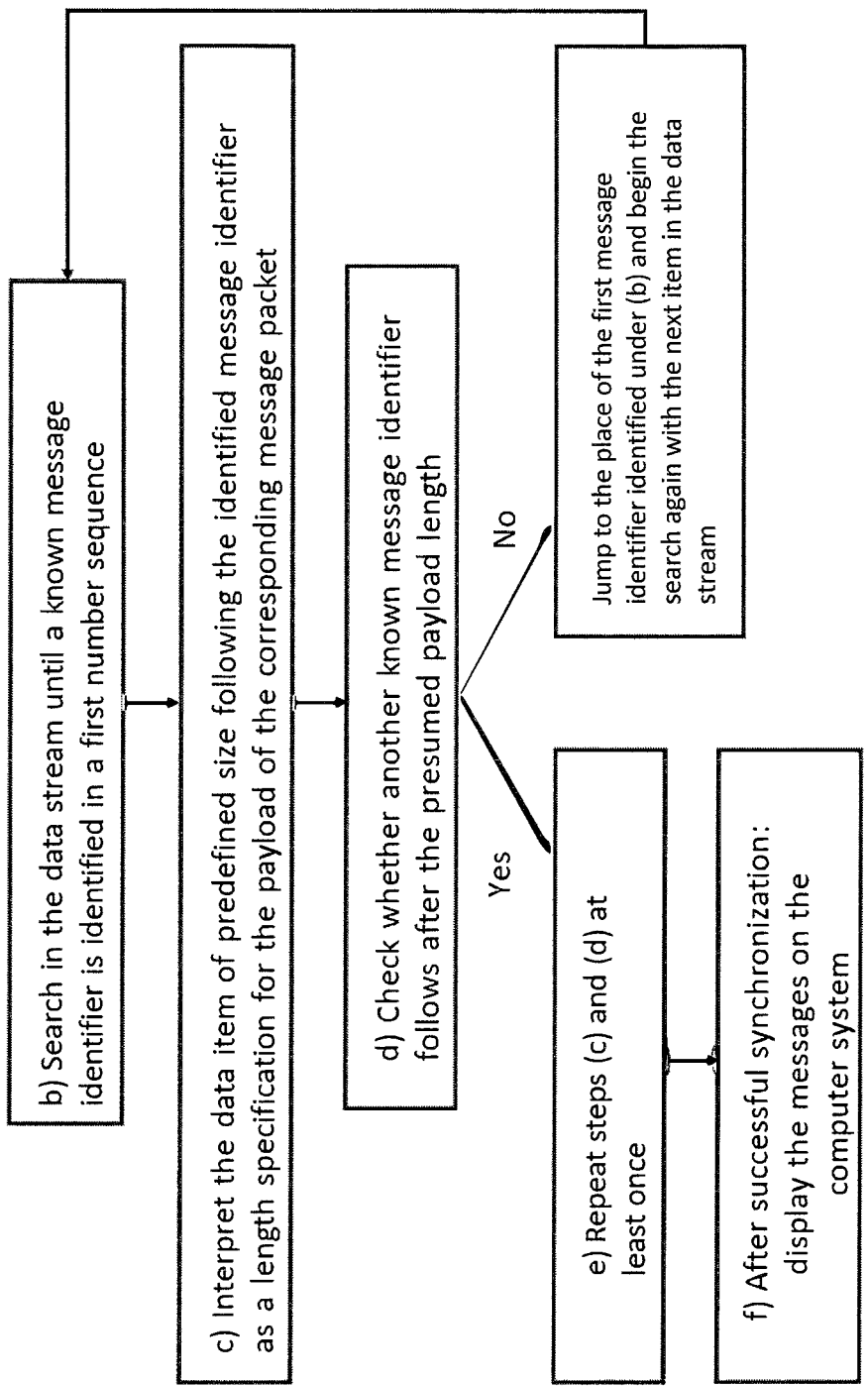
FIG. 3 shows a flowchart for carrying out the method according to the invention.

FIG. 3 shows a flowchart of the method according to the invention for analyzing the data stream coming into the computer system RS. Steps b to d have already been explained in the description for FIG. 2, as have steps e and f, which follow in the left branch of the chart after an affirmative answer. If the data stream has no known identifier ID1, ID2, or ID3 after the presumed payload length in step d, however, then the chart shows that a return to method step b must occur in carrying out the method, more specifically that it is then necessary for the new search in the data stream to return to the place of the first identified identifier ID1 and from there to begin with the immediately following byte.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for monitoring message packets that are exchanged between at least two control units, wherein the message packets are concatenated in a data stream, wherein the message packets each have an identifier, a payload, and a length specification of the payload described by a data item of predefined word size, wherein the at least two control units are connected by a distributor, wherein the distributor is connected by a first distributor port to a first of the at least two control units, is connected by a second distributor port to a second of the at least two control units, and is connected by a third distributor port to a computer system, wherein the data stream flows through the first distributor port and the second distributor port to communicate between the first control unit and the second control unit, wherein the computer system has a memory, and wherein information on the respective identifiers of the message packets is stored in the memory, and wherein a program for carrying out the method steps is stored in the memory, the method comprising:
   a. mirroring the data stream between the first distributor port and the second distributor port at the third distributor port, and transmitting the data stream to the computer system;
   b. searching in the data stream until a first known identifier is identified;
   c. reading the data item of a predefined size following the identified identifier and interpreting the data item as a length specification for the payload of the corresponding message packet for the identified identifier;
   d. checking whether the data stream has an additional known identifier after the interval determined by the length specification from step c;
   e. repeating at least once the steps c and d for the corresponding additional known identifiers; and
   f. displaying or recording on the computer system of the messages identified in the data stream if the check in step d also has a positive result after the at least one repetition.

2. The method according to claim 1, wherein a required number of successive repetitions of a positive identification of an identifier from step d are specified.

3. The method according to claim 1,
   wherein a return in the data stream to the identifier identified in method step b and repeating the method starting from step b take place in an event of a negative result of the check from step d, and
   wherein the inspection of the data stream is continued starting from the next byte.

4. The method according to claim 1, wherein the at least two control units are control units under test, and the computer system is provided by a hardware-in-the-loop system for simulating the environment for the control units under test.

5. The method according to claim 4, wherein the information on the respective identifiers of the message packets is specified by a communications matrix.

6. The method according to claim 5,
   wherein the monitoring of the messages takes place during the environment simulation and/or in real time,
   wherein the payloads of the message packets exchanged between the first control unit and the second control unit have signals that are known to the HIL system from the communications matrix as well, and
   wherein the message packets with identified identifiers are processed for display in that the corresponding payloads of the identified message packets are searched for known signals and the recognized signals are caused to be displayed with corresponding marking.

7. The method according to claim 1, wherein the transmission of the message packets takes place via TCP.

8. The method according to claim 1, wherein the message packets conform to the SOME/IP protocol of AUTOSAR.

9. A computer system, for carrying out the method comprising:
   a port configured to receive a mirror data stream from a third port of a distributor, the mirror data stream mirroring a data stream between a first control unit and a second control unit, the first control unit being connected to a first distributor port of the distributor and the second control unit being connected to a second distributor port of the distributor;

an inspection program configured to monitor message packets exchanged between the first control unit and the second control unit, the message packets being concatenated in a data stream, wherein the message packets each have an identifier, a payload, and a length specification of the payload described by a data item of predefined word size; and a memory configured to store respective identifiers of the message packets, wherein the inspection program is configured to:
- b. search in the data stream until a first known identifier is identified;
- c. read the data item of a predefined size following the identified identifier and interpret the data item as a length specification for the payload of the corresponding message packet for the identified identifier;
- d. check whether the data stream has an additional known identifier after the interval determined by the length specification from step c;
- e. repeat at least once the steps c and d for the corresponding additional known identifiers; and
- f. display or record the messages identified in the data stream if the check in step d also has a positive result after the at least one repetition.

* * * * *